3,282,678
SMELTING REDUCED IRON ORE PELLETS IN THE BLAST FURNACE
Norwood B. Melcher and Morris M. Fine, Minneapolis, Minn., and Philip L. Woolf, Pittsburgh, Pa., assignors to the United States of America as represented by the Secretary of the Interior
No Drawing. Filed Jan. 16, 1964, Ser. No. 338,268
2 Claims. (Cl. 75—41)

The invention herein described and claimed may be manufactured and used by or for the Government of the United States of America for governmental purposes without the payment of royalties thereon or therefor.

This invention relates to production of pig iron in a blast furnace.

Improvement in the quality of blast furnace raw materials (burden) in recent years has resulted in substantial increases in productivity. Among modern burden materials are iron ore pellets which may contain about 63–65 percent iron, usually as ferric oxide. These materials cannot be greatly improved by physical means because the content of extraneous gangue material in the iron ore concentrates (from which pellets are manufactured) is usually quite low.

Partial reduction of iron ore prior to use in blast furnaces or steel furnaces has also been suggested, as disclosed in Patent No. 2,523,138. However, such processes have been only partially successful in achieving increased productivity of pig iron or steel.

It is therefore an object of the present invention to provide a method of increasing blast furnace productivity.

It is a further object of the invention to lower the coke rates of blast furnaces.

It has now been found that these objects may be accomplished by means of a process in which prereduced iron ore pellets, i.e., pellets in which the ore has been partially reduced to metallic iron, are employed as at least part of the iron ore portion of the blast furnace burden. The use of such prereduced pellets has been found to result in a sharp increase in pig iron production rate and an equally sharp decrease in the quantity of coke required per unit of pig iron produced.

Furthermore, it has been found that a linear relationship exists between the percent of prereduction of the ore and both the production rate and decrease in coke consumption. These relationships are expressed by the following equations:

$$P = k_1 R$$

and $$C = k_2 R$$

where P is the percentage increase in production rate of pig iron as compared to that resulting from smelting unreduced iron ore pellets, C is the savings in coke (pounds) per ton of pig iron produced as compared to that resulting from smelting unreduced pellets and R is the percent of prereduction, i.e., the percent of oxygen removed from the ore prior to use in the blast furnace burden. Knowledge of the relationships expressed by the above equations is obviously very advantageous in operation of the blast furnace using prereduced ore pellets since they make possible prediction of the magnitude of improvement (increase of production) as well as the manner in which the furnace must be operated (amount of coke required) to achieve the benefits of the use of prereduced pellets.

The means employed for prereduction of the pellets is not critical and may be accomplished by a variety of means conventionally employed in reduction of iron ores, e.g., various reducing agents such as coke, coal, CO, $H_2$, etc., may be employed and various temperatures may be used depending on the type of reductant employed and the amount and physical state of the pellets. The extent of prereduction may also vary considerably, generally being from about 30 to 90 percent.

The ore pellets need not all be reduced to the same extent. As will be seen in the examples below, the burden may comprise mixtures of pellets of different degrees of reduction or mixtures of reduced pellets and nonreduced pellets.

The pellets may be prepared by first hardening (induration) by heating to a high temperature. The hardened iron ore pellets are subsequently reheated and reduced with solid or gaseous reductants. It has been found, however, that a particularly good burden material results from preparing the pellets according to a process in which induration (of green pellets) and reduction are accomplished simultaneously. According to this process the carbonaceous reductant is not incorporated in the pellet but is external thereto and functions both as a reductant and to cushion the uncured spheres until hardening takes place. The following example illustrates this method of preparation of the preferred pellets.

EXAMPLE 1

*Preparation of prereduced pellets*

100 parts of iron ore concentrate, containing 7–10% moisture was thoroughly mixed with ½ to 1½ parts bentonite binder and fed to a rotary disc pelletizer where spherical green pellets are formed. After these reached a size of approximately ⅝ inch they were screened to remove undersized pellets and then fed to a rotary kiln together with 25 to 100 parts of solid reductant and a small amount, e.g., 2 to 6 parts of limestone. Lignite, lignite char, coke, anthracite coal are among solid reductants which have been employed successfully in the laboratory or on a pilot plant scale.

The materials were heated in the rotary kiln by natural gas, whereby the green ore pellets were reduced and hardened simultaneously. The extent of the reduction and the degree of hardness are a function of the residence time in the kiln and the maximum operating temperature. We have discovered the maximum temperature should not exceed 1250° C. and preferably not more than 1150° C. Ordinarily ½ hour or more at the maximum temperature is required.

The reduced and hardened pellets were protected from contact with air as they discharged from the rotary kiln and were cooled to ambient temperatures in a dry, non-oxidizing atmosphere. The cooled mixture of reduced pellets, ash, lime and excess reductant was screened. The minus ¾-in. plus ¼-in. fraction was sent to a dry, low-intensity magnetic separator and the magnetic fraction recovered as finished product. The non-magnetic fraction was discarded.

*Experimental data*

Table 1 lists the results of 14 consecutive days of operation utilizing a pilot-sized rotary kiln 3 ft. in diameter by 36 ft. long. The reductants were either lignite or mixtures of lignite and anthracite coal. The rates at which these materials were introduced to the kiln on an hourly basis are also given. Green iron ore pellets (about ½-in. diam.) containing about 9 percent moisture and with an iron content of 63.5 percent (dry basis) were also introduced to the kiln at the rates indicated. A high degree of metallization was achieved and the total iron content of the product pellets was in many cases over 80 percent. The temperature range in the kiln was from 400° C. at the feed end to 1150° at the discharge end. The pellets were in the kiln 1½ hours to 2 hours with approximately ½ hour in the hottest zone.

TABLE 1.—RESULTS OF FOURTEEN DAYS PREREDUCED PELLET PRODUCTION

| Days of test (24 hour periods) | Lignite (lbs./hr.) | Anthracite (lbs./hr.) | Wet pellets (lbs./hr.) | Compressive strength (lbs.) | Percent Total Fe | Percent Metallic Fe | Fe°, Total Fe |
|---|---|---|---|---|---|---|---|
| 1 | 355 | 0 | 345 | 380 | 80.0 | 63.8 | 0.797 |
| 2 | 315 | 0 | 370 | 435 | 77.5 | 54.9 | 0.708 |
| 3 | 320 | 0 | 320 | 355 | 77.7 | 58.3 | 0.750 |
| 4 | 355 | 0 | 345 | 380 | 80.5 | 63.6 | 0.790 |
| 5 | 350 | 0 | 370 | 425 | 79.6 | 59.0 | 0.741 |
| 6 | 350 | 0 | 355 | 340 | 80.6 | 62.3 | 0.773 |
| 7 | 350 | 0 | 400 | 320 | 80.7 | 63.0 | 0.781 |
| 8 | 380 | 0 | 440 | 320 | 81.1 | 65.7 | 0.810 |
| 9 | 310 | 95 | 445 | 345 | 80.0 | 61.1 | 0.764 |
| 10 | 320 | 100 | 440 | 285 | 78.4 | 56.3 | 0.718 |
| 11 | 305 | 100 | 430 | 300 | 79.7 | 59.7 | 0.749 |
| 12 | 310 | 95 | 485 | 380 | 80.4 | 61.7 | 0.767 |
| 13 | 215 | 195 | 470 | 475 | 75.2 | 44.7 | 0.594 |
| 14 | 230 | 200 | 455 | 415 | 74.5 | 43.0 | 0.577 |

EXAMPLE 2

A number of reduced and unreduced ore pellets were smelted alone or in various combinations in the Bureau of Mines experimental blast furnace at Bruceton, Pennsylvania. This furnace had a 4-foot diameter hearth, 20-foot stack and 39-inch bosh. Because the furnace is small, cooling losses relative to the heat input were large compared to a commercial blast furnace, hence the hot blast temperatures employed were substantially higher than would be required industrially. However, high blast temperatures are desirable in any installation as a means of realizing the ultimate in productivity and coke savings with the reduced burden materials. The blast air volume was constant at a nominal 800 s.c.f.m.; it contained 7.0 grains moisture per cubic foot and a constant 2.1 volume percent of natural gas. Other data are presented in Tables 2, 3 and 4.

TABLE 2.—IDENTIFICATION AND ANALYSES OF MATERIALS USED IN COMPARING PREREDUCED AND OXIDE PELLETS IN THE BUREAU OF MINES EXPERIMENTAL BLAST FURNACE [1]

| Description | Designation | Analysis, percent dry | | | | |
|---|---|---|---|---|---|---|
| | | Fe | $SiO_2$ | $Al_2O_3$ | CaO | MgO |
| Commercial oxide pellets from Hoyt Lakes, Minn. concentrates | A | 62.8 | 8.5 | 0.45 | 0.63 | 0.39 |
| Prereduced pellets from Hoyt Lakes, Minn. concentrates | B | 79.0 | 11.9 | .77 | 1.08 | .58 |
| Commercial oxide pellets from Hilton Mine (Quebec) concentrates | C | 66.7 | 2.1 | .51 | .30 | 1.71 |
| Partially prereduced pellets from Hilton Mine (Quebec) concentrates | D | 83.8 | 3.1 | .66 | .58 | 2.06 |
| Highly prereduced pellets from Hilton Mine (Quebec) concentrates | E | 91.3 | 3.0 | .64 | .39 | 2.40 |
| Calcite | | .19 | .83 | .29 | 54.6 | .64 |
| Dolomite | | .67 | .93 | | 29.7 | 21.6 |
| Limestone | | .75 | 3.5 | .61 | 52.3 | .56 |
| Gravel | | 3.2 | 81.8 | 4.9 | 2.3 | .41 |
| Coke ash | | 6.8 | 51.0 | 29.6 | 3.2 | 1.3 |

[1] The proximate analysis of the coke was as follows: Volatile matter, 0.8; Fixed carbon, 92.0; ash, 7.2 percent.

TABLE 3.—COMPARISON OF PARTIAL-PREREDUCED PELLET BURDENS WITH AN OXIDE PELLET BURDEN, EXPERIMENTAL BLAST FURNACE OPERATING DATA

| | Base period 1 | Test No. 1 | Base period 2 | Test No. 2 |
|---|---|---|---|---|
| Blast temperature, °F | 1,526 | 1,561 | 1,976 | 2,001 |
| Wind rate, s.c.f.m | 787 | 795 | 791 | 778 |
| Burden, pounds per charge: | | | | |
|   A pellets | 598.4 | 300.0 | 695.5 | |
|   B pellets | | 242.0 | | 621.2 |
| Average Fe in burden, percent | 62.82 | 70.04 | 62.82 | 78.98 |
| Burden ratio, pounds Fe per pound coke in charge | 1.67 | 2.18 | 1.77 | 2.58 |
| Slag rate, pounds per ton pig iron | 643 | 655 | 634 | 738 |
| Top gas: | | | | |
|   Excess $CO_2$, percent of total $CO_2$[1] | | 8.2 | | 24.2 |
|   Temperature, °F | 534 | 497 | 425 | 392 |
|   $CO_2$, percent by volume | 17.1 | 13.6 | 20.2 | 7.0 |
|   $CO \div CO_2$ | 1.22 | 1.73 | .96 | 4.30 |
| Production rate: | | | | |
|   Net tons per day (n.t./d.) | 16.2 | 20.0 | 18.1 | 24.5 |
|   Percent increase | | 23.5 | | 35.4 |
| Coke rate: | | | | |
|   Pounds per net ton pig iron | 1,128 | 900 | 1,075 | 723 |
|   Percent decrease | | 20.2 | | 32.7 |
| Natural gas injection: | | | | |
|   Cu. ft. per ton pig iron | 1,505 | 1,220 | 1,344 | 944 |
|   Percent of wind blown | 2.1 | 2.1 | 2.1 | 2.1 |
| Solution loss, pounds C per ton pig iron | 14 | −26 | 60 | −32 |

[1] That portion of $CO_2$ in top gas originating from sources other than reduction of iron oxides and flux decomposition.

TABLE 4.—COMPARISON OF VARIOUS REDUCED PELLET BURDENS WITH AN OXIDE PELLET BURDEN, EXPERIMENTAL BLAST FURNACE OPERATING DATA

|  | Base period | Test No. 3 | Test No. 4 | Test No. 5 |
|---|---|---|---|---|
| Blast Temperature, °F | 1,734 | 1,700 | 1,729 | 1,750 |
| Wind rate, s.c.f.m | 785 | 791 | 778 | 785 |
| Burden, pounds per charge: |  |  |  |  |
| A pellets | 77 | 100 |  | 120 |
| C pellets | 519 |  |  |  |
| D pellets |  | 550 | 256 |  |
| E pellets |  |  | 445 | 590 |
| Average Fe in burden, percent | 66.19 | 80.57 | 88.54 | 86.49 |
| Burden ratio, pounds Fe per pound coke in charge | 1.72 | 2.68 | 3.10 | 3.07 |
| Slag rate, pounds per ton pig iron | 280 | 243 | 297 | 282 |
| Top gas: |  |  |  |  |
| Excess $CO_2$, percent of total $CO_2$ [1] |  | 11.6 | 42.4 | 78.4 |
| Temperature, °F | 681 | 685 | 633 | 644 |
| $CO_2$, percent by volume | 16.5 | 10.2 | 8.8 | 5.7 |
| $CO \div CO_2$ | 1.35 | 2.61 | 3.11 | 5.07 |
| Production rate: |  |  |  |  |
| Net tons per day | 18.1 | 25.0 | 27.4 | 28.0 |
| Percent increase |  | 38.1 | 51.4 | 54.7 |
| Coke rate: |  |  |  |  |
| Pounds per net ton pig iron | 1,105 | 732 | 625 | 621 |
| Percent decrease |  | 33.8 | 43.4 | 43.8 |
| Natural gas injection: |  |  |  |  |
| Cu. ft. per ton pig iron | 1,315 | 948 | 867 | 849 |
| Percent of wind blown | 2.1 | 2.1 | 2.1 | 2.1 |
| Solution loss, pounds C per ton pig iron | 73 | −22 | −63 | −72 |

[1] That portion of $CO_2$ in top gas originating from sources other than reduction of iron oxides and flux decomposition.

Table 2 presents analyses of the iron-bearing raw materials tested in the blast furnace and the designations by which they are identified in succeeding discussions. All were commercial products except the experimental prereduced pellets made as described above and designated "B."

Table 3 compares the results of tests in which the B pellets were smelted in competition with commercial oxide pellets made from the same raw materials. In a base period at nominal hot-blast temperature of 1500° F. with a burden comprised of A pellets, the production rate was 16.2 net tons per day and 1128 pounds of coke were consumed per net ton. In test 1 which followed immediately thereafter, about half the iron units in the feed were supplied by B pellets so that the average iron content in the burden was 70.04 percent. The production rate rose to 20.0 n.t./d., an increase of 23.5 percent and the coke rate dropped to 900 lb./n.t., a decrease of 20.2 percent. The significance of other details of the operation, listed in Table 2, will be apparent to one skilled in the art and need not be discussed further. A new base period (2) was established with A pellets at a higher hot-blast temperature (2000° F. nominal) and then a burden of all B pellets was smelted. With the reduced pellets, a production rate of 24.5 n.t./d. was realized (35.4 percent increase) and the coke rate dropped to 723 lb./n.t. (32.7 percent decrease). Note also that as the metallic iron content of the burden increased the top gas became richer in CO.

Similar experiments were made with commercial reduced pellets (D and E) which were partially, and highly reduced respectively. After establishing a base period with oxide pellets (A and C), tests 3, 4 and 5 were conducted in which all or part of the burden was made up of reduced pellets. Results are given in Table 4. Again productivity made a spectacular leap as the iron content of the burden went up and, consequently, coke consumption declined. The highest production rate was 28.0 n.t./d. (54.7 percent better than the base period), with a coke rate of 621 (43.8 percent decrease). All the statistics are presented in Table 4.

Percent prereduction (percent oxygen removed from the ore or pellets prior to use in the blast furnace) was plotted against the savings in coke as compared to that resulting from smelting unreduced pellets. The resulting plot, Graph 1, is a straight line through the origin with the equation $C = k_1 R$ where C is the savings in coke in pounds per ton of pig iron produced, $k_1$ is 5.7 and R is the percent prereduction.

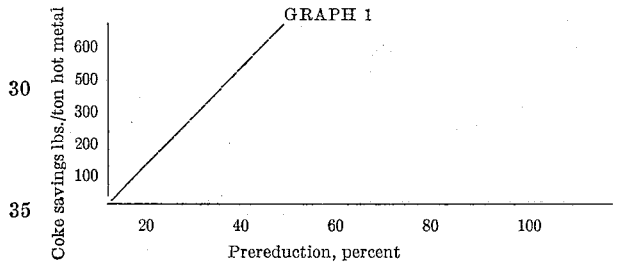

GRAPH 1

Similarly, prereduction was plotted against percent increase in production rate. In this case prereduction is proportional to the percentage increase in production rather than the absolute value as in the case of coke savings. As seen in Graph 2, this plot is again a straight line with the equation $P = k_2 R$ where P denotes increase in production rate as compared to that resulting from smelting unreduced pellets, $k_2$ is 0.6 and R is the percent prereduction.

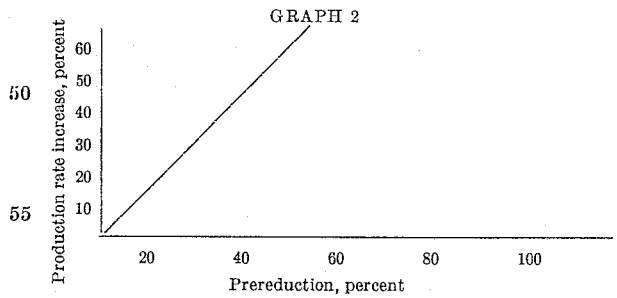

GRAPH 2

Alternate ways of expressing these equations are $$C = 100k_1\left(1 - 2.33 \frac{O_r}{Fe_r}\right) \text{ and } P = 100k_2\left(1 - 2.33 \frac{O_r}{Fe_r}\right)$$

where C, P, $k_1$ and $k_2$ are as given previously, $Fe_r$ is the iron content of the prereduced ore and $O_r$ is the oxygen chemically combined with $Fe_r$.

The above data were obtained with a constant absolute volume of blast air, moisture and natural gas; however, the wind rate per pound of carbon gradually diminished. The blast temperature varied from a nominal 1500° F. to 2000° F. Hence, the relationships shown in Graphs 1 and 2 are independent of hot blast temperature, provided that blast temperature in the base period with unreduced burden is substantially the same as the trial periods with metallized burden. These relationships offer the blast furnace operator a means for determining the amount of coke required for most economical operation and the increase in metal production to be gained from replacing the conventional iron oxide with a wide range of metallized burdens. Although the data were derived in the Bureau's experimental blast furnace, the findings are valid for an industrial furnace operating under comparable conditions. In placing a partially reduced burden on the furnace, the operator may estimate the decrease in initial coke requirements with the equation $C=5.7R$ and the expected production rate increase from $P=0.6R$. Subsequent operation may establish somewhat different relationships depending on furnace geometry and operating characteristics. Similarly, for furnaces operating under other conditions (oil-, coal-, or oxygen injection, higher wind rates, etc.) these equations will guide the operator for initial trials with reduced burdens. Thereafter only a few smelting tests would be required to determine the value of the constants $k_1$ and $k_2$, and thus determine the linear relationships between C, P and R.

A principal reason for the additional gains realized from the metallized burden is that as the degree of reduction increases, the blast furnace operation approaches that of the cupola. In a blast furnace virtually all the coke carbon is partially combusted according to the equation:

$$C + \tfrac{1}{2}O_2 \rightarrow CO$$

which yields 53,280 B.t.u. per pound mol of carbon. In a cupola furnace most of the carbon is burned completely: $C+O_2 \rightarrow CO_2$ which yields 169,290 B.t.u. per pound mol of carbon and the heat energy is consumed in melting rather than smelting. Hence, to realize the maximum benefits of the reduced burden, the blast furnace operation must trend toward that of the cupola, e.g., a higher air-to-carbon ratio. In these tests as the degree of prereduction went from 0 to 87, the blast air at a nominal 800 s.c.f.m. went from 454 to 473 s.c.f. per pound of coke. It is prognosticated that as the cupola operation is approached and the proportion of coke in the blast furnace becomes lower and lower, some of the coke is burned to $CO_2$ and leaves the tuyere zone without reduction to CO. In some of these tests, with the highly reduced burdens, the $CO_2$ content of the top gas was higher than could be accounted for by the $CO_2$ in the flux and the formation of $CO_2$ from indirect reduction in the stack. This can be explained, as noted above, by burning carbon at the tuyeres to $CO_2$ or carbon deposition in the stack ($2CO \rightarrow C + CO_2$). In either event, more energy would be available in the tuyere zone.

The data presented were derived through the use of iron oxide pellets and reduced pellets of roughly spherical shape which had been pelletized in conventional discs or drums. These data are illustrative of the manner in which the invention may be practiced but are not exclusive. Those skilled in the art will recognize that other reduced agglomerates such as those prepared from briquetted or extruded fine iron ore and concentrates may also be satisfactorily utilized. In our experiments, the blast furnace was operated with injections of both natural gas and moisture with the air through the tuyeres. The furnace could also be operated with injections of bituminous, crude oil, other hydrocarbons, or oxygen either in addition to, or in place of, those injectants actually employed in the experiments.

What is claimed is:

1. A method for the production of pig iron from iron ores by reduction employing coke and limestone in a blast furnace, and wherein an iron ore partially prereduced to a higher total iron content prior to charging said ore to a blast furnace is employed, the improvement comprising adding coke in an amount in lbs. per ton of hot metal produced which is less than the amount required for a non-prereduced ore in the blast furnace by $k_1R$, where $k_1$ is a constant having a value of about 5.7 and R is the percentage of prereduction of the iron ore, whereby the percentage increase in productivity in a given time over pig iron produced in the blast furnace employing non-prereduced ores is $k_2R$ wherein $k_2$ is a constant having a value of about .6 and R is the percent of prereduction of the iron ore.

2. In a method and improvement as set forth in claim 1, the further improvement which comprises injecting natural gas and moisture into the blast furnace.

References Cited by the Examiner

UNITED STATES PATENTS

| | | | |
|---|---|---|---|
| 1,489,361 | 4/1924 | Moxham | 75—38 |
| 1,941,983 | 1/1934 | Gudmundsen | 75—42 |
| 2,544,697 | 3/1951 | Lewis | 75—41 X |
| 2,605,179 | 7/1952 | Lindemuth | 75—41 X |

DAVID L. RECK, *Primary Examiner.*

H. W. TARRING, *Assistant Examiner.*